(12) United States Patent
Winterfeld et al.

(10) Patent No.: US 11,934,657 B2
(45) Date of Patent: Mar. 19, 2024

(54) OPEN BLOCK MANAGEMENT IN MEMORY DEVICES

(71) Applicant: MICRON TECHNOLOGY, INC., Boise, ID (US)

(72) Inventors: Michael Winterfeld, Firestone, CO (US); Juane Li, Milpitas, CA (US)

(73) Assignee: Micron Technology, Inc., Boise, ID (US)

( * ) Notice: Subject to any disclaimer, the term of this patent is extended or adjusted under 35 U.S.C. 154(b) by 30 days.

(21) Appl. No.: 17/889,179

(22) Filed: Aug. 16, 2022

(65) Prior Publication Data
US 2024/0061575 A1 Feb. 22, 2024

(51) Int. Cl.
*G06F 3/06* (2006.01)
(52) U.S. Cl.
CPC ............ *G06F 3/0608* (2013.01); *G06F 3/064* (2013.01); *G06F 3/0644* (2013.01); *G06F 3/0679* (2013.01)
(58) Field of Classification Search
None
See application file for complete search history.

(56) References Cited

U.S. PATENT DOCUMENTS

| 2022/0156000 | A1* | 5/2022 | Inbar | G06F 3/0658 |
| 2023/0031745 | A1* | 2/2023 | Noh | G06F 3/0656 |
| 2023/0033773 | A1* | 2/2023 | Choi | G06F 3/0608 |
| 2023/0078249 | A1* | 3/2023 | Choi | G06F 3/061 |
| | | | | 711/103 |

* cited by examiner

Primary Examiner — Nathan Sadler
(74) Attorney, Agent, or Firm — Lowenstein Sandler LLP

(57) ABSTRACT

A method for tracking open blocks in a memory device includes partitioning, by a memory sub-system controller, a storage region in the memory device into a plurality of channels, each channel including a plurality of planesets, and each planeset comprising a plurality of blocksets. The method further includes distributing evenly between the plurality of channels a plurality of active zones ready for a write operation. Each active zone includes one or more open blocks. The method further includes sending, by the memory sub-system controller, an open block message to a controller in the memory device, the open block message including channel identifying information, planeset identifying information, and blockset identifying information. The channel identifying information, the planeset identifying information, and the blockset identifying information collectively identify one or more open blocks ready for a write operation in the memory device.

20 Claims, 5 Drawing Sheets

OPEN BLOCK MANAGEMENT IN MEMORY DEVICES

TECHNICAL FIELD

Embodiments of the disclosure relate generally to memory sub-systems, and more specifically, relate to tracking open blocks in a zoned namespace of a memory device in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
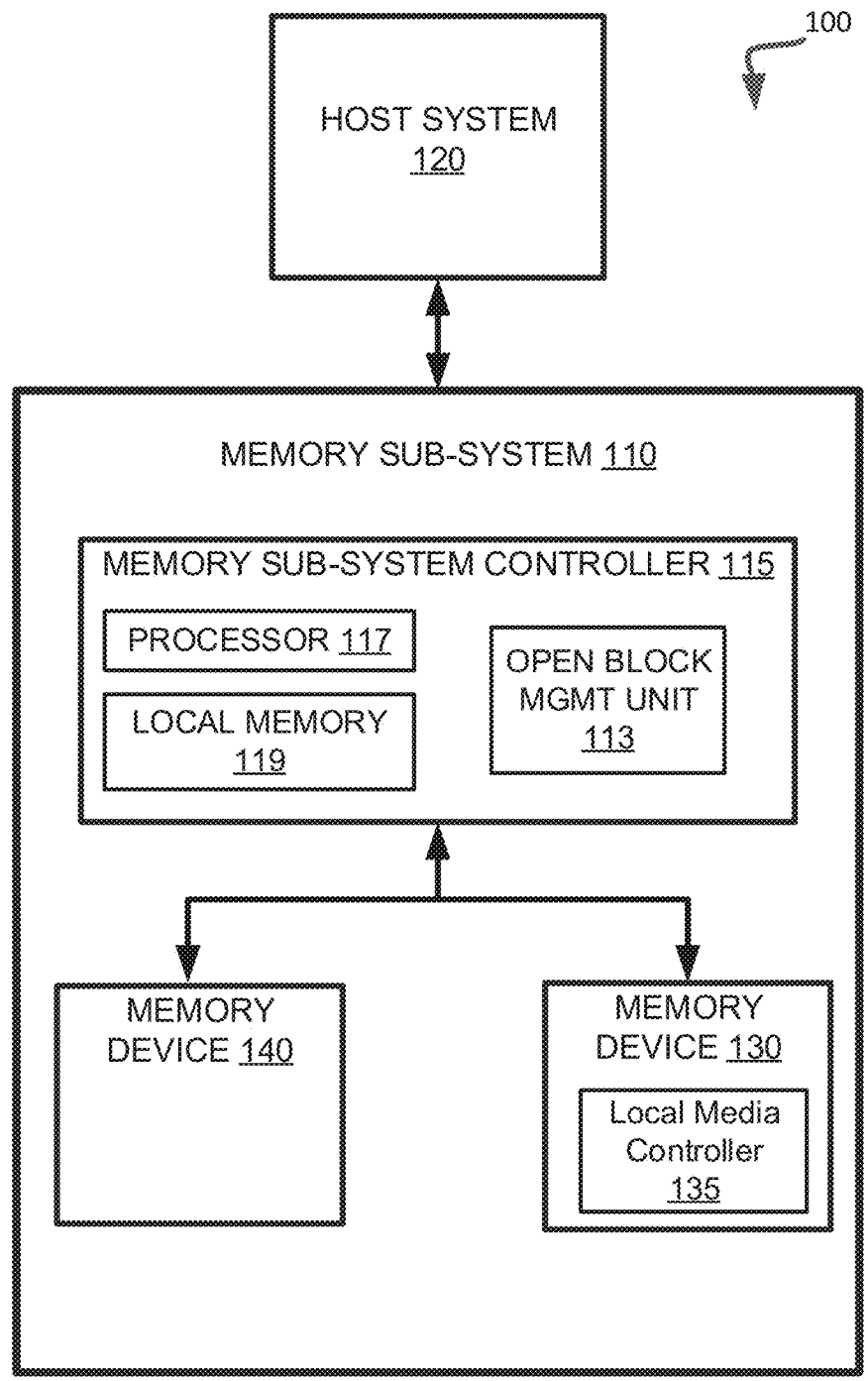
FIG. 1 illustrates an example computing system that includes a memory sub-system in accordance with some embodiments of the present disclosure.

Aspects of the present disclosure are directed to systems and methods for tracking open blocks in a zoned namespace of a memory device in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a three-dimensional cross-point ("3D cross-point") memory device that is a cross-point array of non-volatile memory that can perform bit storage based on a change of bulk resistance, in conjunction with a stackable cross-gridded data access array. Another example of a non-volatile memory device is a negative-and (NAND) memory device. Other examples of non-volatile memory devices are described below in conjunction with FIG. 1. Each of the memory device can include one or more arrays of memory cells. A memory cell ("cell") is an electronic circuit that stores information. Depending on the cell type, a cell can store one or more bits of binary information, and has various logic states that correlate to the number of bits being stored. The logic states can be represented by binary values, such as "0" and "1", or combinations of such values. For example, a single level cell (SLC) can store one bit of information and has two logic states. Similarly, a multi-level cell (MLC) can store two bits per cell, a triple level cell (TLC) can store three bits per cell, a quad level cell (QLC) can store four bits per cell, and a penta level cell (PLC) can store five bits per cell.

A memory device can be made up of bits arranged in a two-dimensional grid. Memory cells are etched onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types.

The memory sub-system and memory devices can store data from the host system in storage media, e.g., integrated circuit (IC) dies having addressable memory cells that individually store the data. Processing in certain memory sub-systems today is generally performed with random allocations to the memory devices and in small increments of data, e.g., four kilobytes (KB). These random allocations of a page or a block of data include non-sequential and/or random writes to the memory devices. This practice results in high costs in memory, e.g., dynamic random access memory (DRAM), static random access memory (SRAM), or persistent memory, for storing mapping data structures that track logical-to-physical (LTP) address mapping between logical block address (LBA) space and physical address space of the IC dies. For example, mapping overhead is about a gigabyte (GB) per terabyte (TB) of host addressable media, and thus, a 16 TB solid-state drive (SSD) requires a significant 16 GB of memory mapping overhead. Additionally, periodic snapshotting and logging is done to persist the mapping data structures across shutdowns and surprise power failure situations. This adds additional write overhead to the IC dies and performance loss.

Storage stacks are in the process of being modified to take advantage of sequential input-output (IO) memory device efficiencies. For example, storage stacks included in file systems group data by locality (e.g., according to thread, process, or application) and write the data sequentially to storage devices. File systems can then write data of different localities as parallel sequential streams to storage devices, each stream having its own locality. Reference to locality can reference either temporal locality or spatial locality. Data having temporal locality is data that a processor tends to access at the same memory locations repetitively over a short period of time, e.g., data written, over-written, and trimmed around the same time. Data having spatial locality captures the tendency that when a memory device references a particular storage location at a particular time, then the memory device is likely to reference nearby memory locations in the near future. In this case, a processor can attempt to determine the size and shape of the area around the current reference for which it is worthwhile to prepare for faster access for subsequent reference. Reference to sequential locality is a special case of spatial locality that occurs when data elements are arranged and accessed linearly, such as in traversing the elements in a one-dimensional array.

When data having locality are written sequentially, the data are written to groups of memory cells that are also referred to as zones for simplicity, where each zone can store multiple physical blocks of data. Thus, mapping can be recorded at a higher granularity (megabytes instead of kilobytes) in order to map a particular data group as a zone in the LBA space, which significantly reduces metadata that is logged. The mapping space associated with the LBA space at this granularity can be referred to as zoned namespace (ZNS), and a memory device written in this manner referred to as a ZNS memory device. In one example, a data group is made up of multiple blocks of data having either temporal and/or spatial locality, where each data block corresponds to a physical block (e.g., erase unit) of the IC dies. In one embodiment, the physical block of a memory device can be around 16 megabytes (MB) in size. The groups of memory cells (or zones) can be at least two to four times (or more) the size of the physical block. Accordingly, the zones can store at least 64 MB of data (e.g., 64 MB, 128 MB, 256 MB, 512 MB, or more), each of which is significantly larger than four kilobytes (KB).

In a ZNS memory device, the address space (e.g., logical block address space) of the memory device (or memory sub-system) is divided into zones which allows for more efficient management of data as the capacity of the memory device increases. For example, each individual zone can be designated for use by a specific client application executed by the host system or some other system with access to the memory device. In a memory device or memory sub-system, one or more zoned namespaces can be implemented, and each zoned namespace can implement one or more zones. A zone can include multiple zone memory units. Each zone can be addressed using a portion of the address space of the memory device or memory sub-system. Data can be written to a particular zone sequentially and independently from other zones.

As used herein, a memory unit can refer to a plane, a block, a page, a cell, a zone, or any other of segment or unit of memory. An open block (also referred to as "open blockset" herein) is one that has not been completely written. For example, a memory unit, such as a block, can be partially written if after writing to the block one or more pages of the block remain unwritten. A memory unit can be closed when the memory unit is completely written. For example, in a closed block all the pages including the last page have been written. A memory unit is open when the memory unit is partially written.

ZNS memory systems are unique in comparison to traditional memory systems due to the relatively large number of open blocks which must be tracked in the memory system. In a traditional memory system, a blockstripe or superblock design is often utilized where a set of blocks with the same block number across multiple NAND dies and planes are grouped together and data is written in a striped fashion across the blockstripe. Often, there are only a few open blockstripes being written to in a traditional memory system, with at least one open blockstripe for incoming host data, one open blockstripe as a target for garbage collection writes, and one open blockstripe for internal system writes. Because blockstripes are used (i.e., the same block number across dies/planes), only a few open blocks exist on a per plane or per die basis and any open block tracking structures and logic has a correspondingly small memory footprint and low impact on code complexity.

In contrast to the blockstripes of traditional memory systems, ZNS memory systems operate in terms of "blocksets" which consist of only a few blocks which are grouped together. For example, on a four plane NAND device, with two blocks per blockset, block number A on planes 0 and 1 may be grouped together as a blockset, while block number A on planes 2 and 3 are another, separate blockset, and so on for every valid block ID across all NAND dies which are used for host data storage. The host interface in ZNS memory systems allows the host to write to some number of zones, and each zone is mapped to an individual blockset on the NAND media. This can result in thousands of open blocksets which can be scattered across different dies, planes, and block numbers. The total number of open blocksets is bounded by the maximum number of active zones allowed in the system, plus some extra open blocksets for internal data refresh (similar to garbage collection), and internal system writes. The large number and scattered nature of open blocksets presents a challenge for open block tracking memory footprint and code complexity in ZNS memory systems.

Aspects of the present disclosure address the above and other deficiencies by tracking open blocks in a memory device in a memory sub-system. In one embodiment, tracking open blocks in a memory device includes partitioning, by a memory sub-system controller, a storage region in the memory device into two or more channels, each channel including two or more planesets, and each planeset comprising two or more blocksets. The method further includes distributing evenly between the channels, a plurality of active zones ready for a write operation. Each active zone includes one or more open blocks. The method further includes sending, by the memory sub-system controller, an open block message to a local media controller in the memory device, the open block message including channel identifying information, planeset identifying information, and blockset identifying information. The channel identifying information, the planeset identifying information, and the blockset identifying information collectively identify one or more open blocks ready for a write operation in the memory device.

Advantages of this approach include, but are not limited to, a reduced memory footprint by partitioning and tracking open blocksets local to a NAND channel. Other advantages include using a single global level table to track all active zones and their corresponding open blocksets. Further advantages include a simple system level design where blocksets move in and out of an active state, and significantly minimalizing garbage collection and reduced write amplification due to writing data with similar data types in groups sequentially by zone. Further, the load balancing of performing writes across multiple zones for different data types enables predictable write performance, where writes are often a bottleneck in current file systems. Other advantages will be apparent to those skilled in the art of memory allocation and mapping to memory devices discussed hereinafter.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a Zoned Namespace (ZNS) SSD, a flash drive, a universal serial bus (USB) flash drive, an embedded Multi-Media Controller (eMMC) drive, a Universal Flash Storage (UFS) drive, a secure digital (SD) and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

In one embodiment, the memory sub-system controller 115 includes an open block management unit 113 that tracks open blocks on one or more memory devices 130. In some embodiments, the memory sub-system controller 115 is in direct communication with the open block management unit 113. The memory sub-system controller 115 can include a processor 117 (e.g., a processing device) configured to execute instructions stored in local memory 119 for performing the operations described herein. In other embodiments, the open block management unit 113 is part of memory sub-system 110, but is separate from memory sub-system controller 115. In other embodiments, local media controller 135 includes at least a portion of open block management unit 113 and is configured to perform the functionality described herein.

Figure 2:
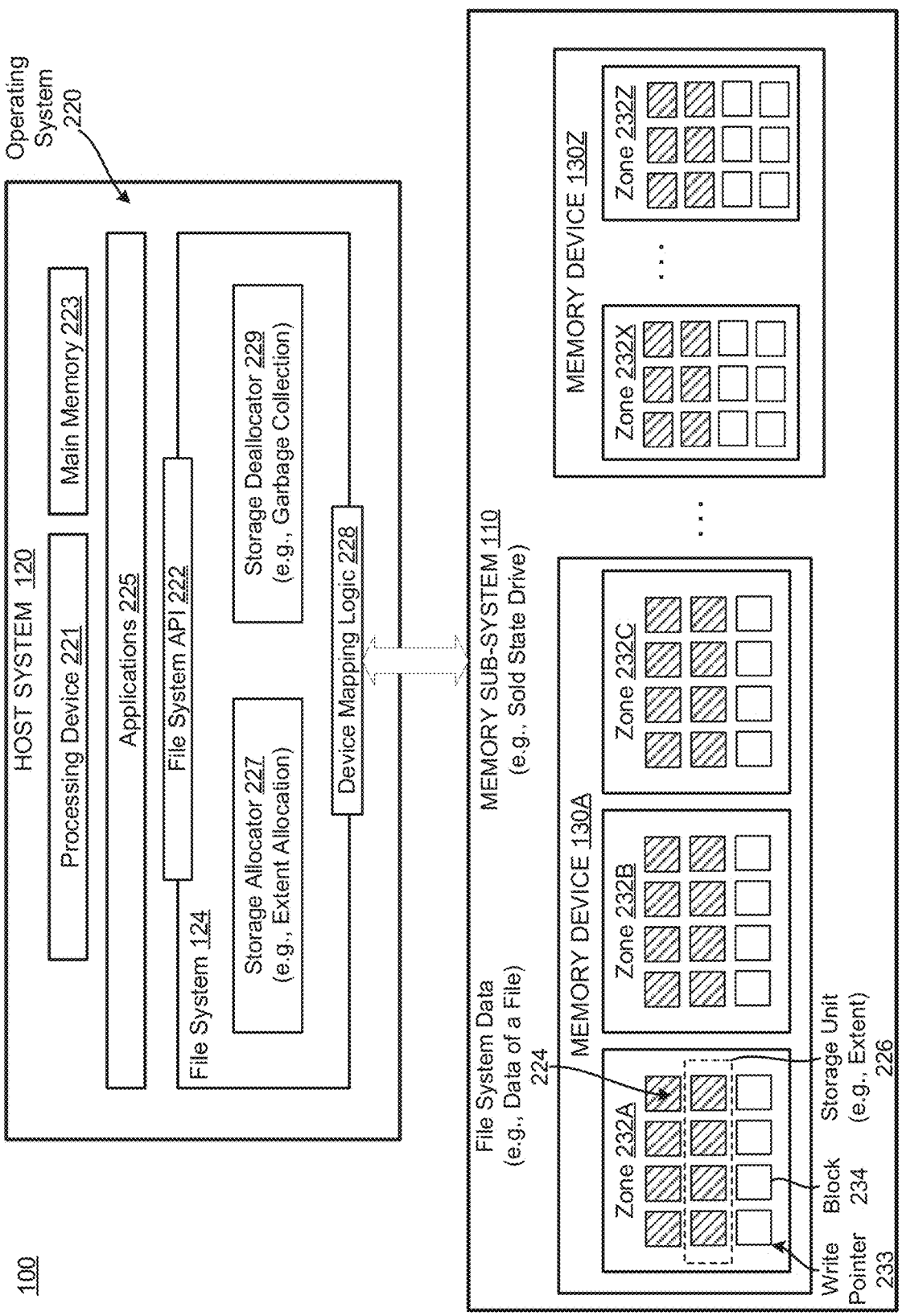
FIG. 2 is a detailed block diagram of the computing system of FIG. 1 in accordance with some embodiments of the present disclosure.

FIG. 2 is a detailed block diagram of the computing system 100 that includes a file system that uses the multiple zones of a memory sub-system to store data more efficiently. In the example shown, host system 120 includes a file system 124, one or more applications 225 and the memory sub-system 110 includes multiple zones 232A-Z that are spread across one or more memory devices 130A-Z.

File system 124 can manage the storage and retrieval of data from the memory sub-system 110. File system 124 can include data structures and rules used to organize the data and can involve separating the data into storage units that that can be individually identified and accessed. File system 124 can be integrated into a kernel, a device driver, an application, other portion of operating system 220, or a combination thereof. File system 124 can execute as one or more system processes (e.g., kernel processes), user processes (e.g., application processes), or a combination thereof.

File system 124 can include multiple layers and the multiple layers can include a logical file system (e.g., logical layer), a virtual file system (e.g., virtual layer), a physical file system (e.g., physical layer), or other layer. The logical file system can manage interaction with applications 225 and can provide an application program interface (e.g., File System API 222) that exposes file system operations (e.g., open, close, create, delete, read, write, execute) to other computer programs. The logical layer of file system 124 can manage security and permissions and maintain open file table entries and per-process file descriptors. The logical file system can pass requested operations (e.g., write requests) to one or more other layers for processing. The virtual file system can enable operating system 220 to support multiple concurrent instances of physical file systems, each of which can be referred to as a file system implementation. The physical file system can manage the physical operation of the storage device (e.g., memory sub-system 110). The physical file system can handle buffering and manage main memory and can be responsible for the physical placement of storage units in specific locations on the memory devices 130A-Z. The physical file system can include device mapping logic 228 and can interact with device drivers or with the channel to interact with memory sub-system 110. One or more of the file system layers can be explicitly separated or can be combined together in order to store file system data 224.

File system data 224 can be any data associated with file system 124 and can include data received by file system 124 or data generated by file system 124. File system data 224 can represent data of one or more external file system objects, internal file system objects, or a combination thereof. The external file system objects can be file system objects that are externally accessible by a computer program (e.g., applications 225) using file system API 222. The external file system objects can include files (e.g., file data and metadata), directories (e.g., folders), links (e.g., soft links, hard links), or other objects. The internal file system objects can be file system objects that remain internal to the file system and are inaccessible using file system API 222. The internal file system objects can include storage tree objects (e.g., extent map, extent tree, block tree), stream objects (e.g., stream identifiers), file group data (e.g., group of similar files), storage units, block groups, extents, or other internal data structures.

Each file system object can be associated with object data and object metadata. The object data can be the content of the object (e.g., file data) and the object metadata can be information about the object (e.g., file metadata). The object metadata can indicate attributes of the object such as a storage location (e.g., zone, block group, storage unit), data source (e.g., stream, application, user), data type (e.g., text, image, audio, video), size (e.g., file size, directory size), time (e.g., creation time, modification time, access time), ownership (e.g., user ID, group ID), permissions (e.g., read, write, execute), file system location (e.g., parent directory, absolute path, local path), other attribute, or a combination thereof. In one example, file system data 224 can include data for a new file and the new file can include file data and file metadata. The file data can include the content of the file (e.g., image content, audio content) and the file metadata can include one or more attributes of the content (e.g., identifier corresponding to a zone z, stream s, and/or application a).

The object data and object metadata (e.g., attributes, tree nodes) can be stored together in the same data structure at the same storage location or can be stored separately in different data structures at different storage locations. For example, file system 124 can store the object metadata in an index node (e.g., inode) data structure and the index node data structure can have one or more pointers to the object data. The inode can be a data structure in a Unix-style file system that describes a file system object. Each inode can indicate the attributes and storage locations (e.g., block addresses) of the data of the file system object. A directory can be represented as an inode and can contain an entry for itself, its parent (e.g., parent directory), and each of its children (e.g., child directories or files). File system 124 can store file system data 224 as one or more storage units 226.

Storage unit 226 can be a contiguous or non-contiguous portion of file system data that is to be stored in a memory device. The storage units can be referred to as file system storage units and can have any size (e.g., 4 KB, 128 KB, 16 MB, 128 MB, 1 GB) and the size can or cannot be based on (e.g. a multiple of) the size of one or more memory storage units (e.g., cells, blocks, pages, zones, dies, devices, or sub-systems). File system 124 can use a fixed size (e.g., constant size or static size) for the storage units in which all of the storage units can be the same size or can use a variable size (e.g., adjustable size, dynamic size) in which the storage units used by file system 124 can have different sizes. The size of the storage unit can be determined (e.g., selected or detected) by storage allocator 227, file system 124, host system 120, memory sub-system 110, memory device 130, other entity, or a combination thereof. The size of storage unit 226 can be determined by the entity before, during, or after design, development, manufacture, installation, initialization, configuration, formatting, other event, or a combination thereof. In one example, each of the storage units 226 can be the same or similar to a file system block group.

File system 124 can divide allocated space into block groups which can be variable-sized allocation regions. The allocation regions can be used to store object metadata (e.g., extent tree node, inodes) and object data (e.g., file content, extents). A block group (BG) can be understood as a contiguous portion a file system object (e.g., a series of LBAs) that is allocated to a contiguous area of a memory device and is reserved for file system data of file system 124. This contiguous area can be represented as a range of block numbers (e.g., physical addresses). Larger files can be partitioned into the block groups that are individually tracked to make allocation and management of the files feasible over a necessary series of allocation and writes to memory devices 130A-Z. The default ratio of object data to object metadata can be 1:2. They are intended to use concepts of the Orlov block allocator to allocate related file system objects together and resist fragmentation by leaving free space between groups. (Ext3 block groups, however, have fixed locations computed from the size of the file system, whereas those in b-tree file system are dynamic and created as needed.) Each block group can be associated with a block group identifier (e.g., block group item). Inodes in the file system tree can include a reference to a corresponding block group (e.g., pointer to storage unit).

An extent is a contiguous area of storage reserved for a file system object of file system 124. Each file system object can consist of zero or more extents and each extent can store a fragment, segment, or portion of the file system object. Each extent can be represented by a one or more numbers (e.g., number pair) and each of the numbers can be a location, position, address, other numeric value, or a combination thereof. In one example, each extent can be represented by a pair of numbers that represent a range (e.g., beginning and end of a range of blocks). Representing an extent as a number pair can be more efficient then canonically storing every block number in the range. The use of extents can also enable the file system to reduce metadata overhead of large files. By way of example, an extent can be allocated inside a block group (BG). For example, suppose a large file of 10 gigabytes (GB) is chunked into pieces of 128 megabytes (MB). Multiples of the 128 MB chunks can be grouped together as extents into an extent map linked to the larger file and that includes metadata. File system 124 can build and retain extent maps to manage these extents or block groups. In some embodiments, extent trees are intended to divide up the available storage of the memory device 130 into a number of flexible allocation policies. Each extent tree can own a section of the underlying memory device, and can be assigned to a collection of (or a single) tree roots, directories or index nodes (inodes). The manner in which file system 124 allocates and deallocates storage units (e.g., extents, block groups) can depend on whether the file system is a copy on write file system.

A copy on write file system can be a file system that implements a copy on write (COW) features for managing file system operations. The copy on write features can be in contrast to a more traditional technique that enables file system data to be written in-place. Copy on write can be referred to as implicit sharing or shadowing and can be a resource management technique that implements a copy operation (e.g., duplicate operation) for resources that are modified. This can involve making a copy of object data (e.g., file data) before modifying the object data. In one example, a copy on write file system can detect if an incoming resource is a duplicate of an existing resource and avoid creating a new resource by sharing access to the existing resource. For example, file system 124 can receive a request to store a new file that is the same as an existing file and instead of storing a duplicate copy of the data for the new file, the file system can associate the new file with the data of the existing file. When a request is received to access the data of the new file, the file system can return data from the existing file. Therefore, the storage resources can be shared between a duplicate and an original copy of the data.

Any write request received for the new or existing files can result in a copy being created and the two files can no longer share a single copy. The write request can include a change that is applied to the original copy (e.g., source storage) or to the new copy (e.g., destination storage) depending on the implementation.

By sharing resources in this way, it is possible to significantly reduce the resource consumption of unmodified copies, while adding a small overhead to resource-modifying operations (e.g., write requests). Copy on write file systems can be better suited for sequential writing because, once data is written, the data cannot be overwritten. When a file system writes to a storage device sequentially, it is more efficient to do so using COW management. For example, data of a similar type can be written as a group and thus can eventually be rewritten elsewhere as a group as well, before becoming stale and subject to garbage collection, including erasure. Writing data of the same data type as a group can thus minimize garbage collection and reduce write amplification. Further, in some embodiments, the kernel of operating system 220 can include device mapping logic 228 that can directly cause the file system data to be written to physical addresses of individual zones and thus map logical addresses to physical addresses of sequentially-written zones, by-passing the need for the memory sub-system controller to handle this mapping.

A B-Tree File System (BTRFS) can be an example of a copy on write file system that uses a B-Tree to process data updates. The B-tree can be a self-balancing tree data structure that maintains sorted data and allows searches, sequential access, insertions, and deletions in logarithmic time. The B-tree can be similar to a binary search tree (e.g., binary tree) and can enable nodes with more than two children. The b-tree file system can involve block management that can group blocks into block groups and each block group (e.g., storage unit 226) can be composed of one or more device extents. The extents of a block group can belong to the same memory device or different memory devices (e.g., in the case of striping). The b-tree file system can support changes the default device storage unit size (e.g., extent size) to the size of a zone so that the storage units are aligned with a zone. The allocation of blocks within a block group can involve allocating sequential blocks from the beginning of the block group and an allocation pointer can be added to block groups as an allocation hint. The allocation pointer can enable blocks to be allocated sequentially within a block group (e.g., sequentially within a zone). The b-tree file system can include a write request staging list that can account for IO that is received out of order. The staging list can delay the execution of unaligned write requests within a block group. The zones of a block group are reset to allow rewriting only when the block group is being freed, that is, when all the blocks within the block group are unused.

In the example shown in FIG. 2, file system 124 can include a storage allocator 227 and a storage deallocator 229 to manage storage space for file system data 224. Storage allocator 227 can interact with memory sub-system 110 to allocate storage space on memory devices 130A-Z. Storage deallocator 229 can interact with memory sub-system 110 to deallocate (e.g., free) storage space on memory devices 130A-Z. Storage deallocator 229 can perform garbage collection of stale blocks of memory that can be erased and written to again. Storage allocator 227 and storage deallocator 229 can be optimized for storing data in zones 232A-Z of memory sub-system 110.

Memory sub-system 110 can include high density non-volatile memory devices where retention of data is desired when no power is supplied to the memory device. One example of non-volatile memory devices is a negative-and (NAND) memory device. Other examples of non-volatile memory devices are described above in conjunction with memory device 130 of FIG. 1. A non-volatile memory device is a package of one or more dies with sets of blocks (e.g., physical blocks) and each block can include a set of pages. A page can include a set of cells (e.g., memory cells) and each cell can be an electronic circuit that stores information. Depending on the cell type, a cell can store one or more bits of binary information and can have various logic states that correlate to the number of bits being stored. The logic states can be represented by binary values, such as "0" and "1", or combinations of such values.

Memory devices 130A-Z can be made up of bits arranged in a two-dimensional grid. Memory cells are etched onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline can constitute the address of the memory cell. A block 234 can refer to a unit of the memory device (e.g., 130A) used to store data and can include a group of memory cells, a wordline group, a wordline, or individual memory cells. One or more blocks can be grouped together to form a zone of a memory device.

Each of the zones 232A-Z can be a contiguous or non-contiguous portion of a memory device (e.g., range of blocks) that is identified and managed as a single unit. Each zone can correspond to zone identification data that can be used to uniquely identify the zone and can be the same or similar to a zone identifier (zone ID), a zone descriptor, a zone label, or other term. A zone can be a memory storage unit and can have a predefined size that can or cannot be based on (e.g., a multiple of) a size of another memory storage unit (e.g., cell, block, page, die, device, or sub-system). Memory sub-system 110 can use a fixed size (e.g., constant size or static size) for the zones in which all of the zones can be the same size or can use a variable size (e.g., adjustable size, dynamic size) in which the zones used by memory sub-system 110 can have different sizes. The size of the zone can be determined (e.g., selected or detected) by memory sub-system 110, memory device 130, file system 124, host system 120, storage allocator 227, other entity, or a combination thereof. The size of storage unit 226 can be determined by the entity before, during, or after design, development, manufacture, installation, initialization, configuration, formatting, other event, or a combination thereof.

Zones 232A-Z can enable more efficient management of storage space as the capacity of the memory device increases. For example, a set of one or more zones can be designated for use by a specific application (e.g., application, process, or thread) executed by the host system or some other system with access to the memory device. Writing to the zones is generally performed sequentially. The sequential write can be performed consecutively from the top of the memory device (e.g., smaller addresses of IC die) to the bottom of the memory device (e.g., larger addresses of the IC die), which is illustrated by the patterned blocks of data already written to the illustrated zones 232A-Z. In these embodiments, the device mapping logic 228 can track block numbers (e.g., logical block addresses) of a name space.

The namespace can include the address space of one or more of the memory devices 130A-Z. A namespace is a quantity of non-volatile memory that can be formatted into blocks (e.g., logical or physical blocks). A controller for memory devices 130A-Z (e.g., controller 115 or 135) can support multiple namespaces that are referenced using namespace identification data (e.g., namespace IDs). A namespace can be associated with a namespace data structure that is created, updated, or deleted using Namespace Management and Namespace Attachment commands. The namespace data structure can indicate capabilities and settings that are specific to a particular namespace. In one example, the name data structure and the namespace can correspond to a zoned namespace.

A zoned namespace (ZNS™) can be a sequential namespace that is defined by the NVM Express™ (NVMe™) organization. A memory device that is configured with a zone namespace can be referred to as a zoned namespace memory device or a ZNS memory device and can implement the Zoned Namespace Command Set as defined by NVMe. In a zone namespace, the address space of each of the memory devices 130A-Z can be divided into one or more zones 232A-Z. When using a zone namespace, writes are performed sequentially starting from the beginning of a zone and can be performed at a larger granularity (e.g., 64 kilobytes) and the zone can be inaccessible for the duration of the write operation. Accordingly, if a read request for data stored in the same zone or a different zone is received while the write operation is ongoing, the memory sub-system will have to suspend the write operation in order to perform the read. In one example, the zoned namespace can be implemented by a controller of a solid state drive (SSD) and include zones 232A-Z, in which there can be one or more zones for each of the one or more memory devices 130A-Z.

Each of zones 232A-Z can correspond to a write pointer (WP) that identifies a location in the zone where a prior sequential write ended. The write pointer 233 can correspond to zone 232A and can point to a beginning of a block (e.g., first available block), an end of a block (e.g., last block written to), a location within a block, or other location. Write pointer 233 can be stored and accessible to the controller of memory device 130A (e.g., controller 135), a controller of memory sub-system 110 (e.g., controller 115), processing device 221 of host system 120 (e.g., in main memory 223), other device or location, or a combination thereof. The write pointer can be used to determine whether an IO write request is directed to the write pointer, and thus is sequential, or is not directed to the write pointer, and is thus non-sequential. The write pointer for each zone can be accessible to the file system 124 for purposes of storage space allocation within the memory device 130A. For example, write pointer 233 can be stored as metadata of a file system object (e.g., metadata of a file system block group) and be used for sequential writes, as discussed in more detail below.

File system 124 can include a file system API 222 that enables computer programs (e.g., applications 225) to store or retrieve data. File system API 222 can enable file system 124 to receive data from external sources, including data from applications 225 (also referred to as user data), operating system (e.g., superblocks of data, file system metadata, and the like). With access to such metadata about these various files of different data types, the file system API 222 can be able to enable file system 124 to perform organization and storage allocation.

The applications 225 can include different types of computer programs or architectures, which function differently with respect hardware and supporting software of the computing system 100. In one embodiment, applications 225 can include a log structure merge (LSM)-based architecture such as a database (e.g., Apache Cassandra™), a staged event-driven architecture (e.g., SEDA), a distributed storage and replication architecture (e.g., Dynamo by Amazon®), a data and storage engine model (e.g., Bigtable by Google®), or other such storage engines designed to process and organize structured data, including big data, for example. In some embodiments, using an LSM-based architecture as an example, the applications 225 can handle a variety of files containing data and/or metadata of different data types. Each of the applications 225 can thus generate, access, and/or manage files of one or more data types.

Figure 3:
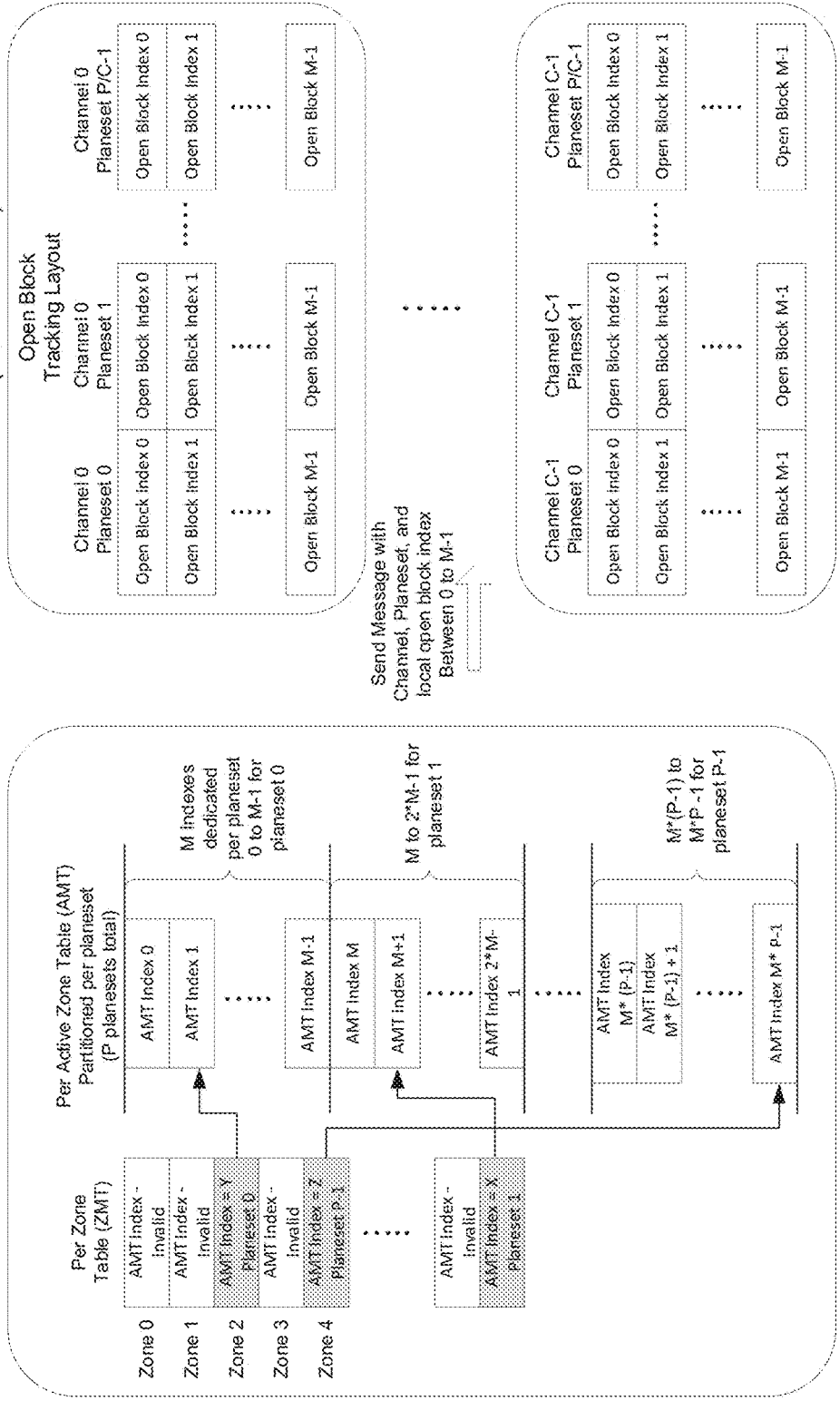
FIG. 3 illustrates open block management in a zoned namespace memory region, in accordance with embodiments of the disclosure.

FIG. 3 illustrates open block management in a zoned namespace memory region, in accordance with one embodiment of the disclosure. In this embodiment, the ZNS firmware maintains tracking data for each active zone in the memory system. As illustrated in the global system domain 510, there can be thousands of active zones, and an index can be assigned per active zone to index into a table, which can be called the active and migrating zone table (AMT). In one embodiment, a per-zone table is also used to track information for every zone in the memory system. Generally, there are an order of magnitude more total zones than active zones and the table indexed by the zone number can be referred to as the ZMT. The ZMT contains an entry for every zone, and a subset of all zones will be active, thus the ZMT entries for active zones contain valid AMT indexes. Each active zone will be mapped to at least one open blockset(s) on the media. The AMT entries contain the blockset numbers for each active zone. As long as there are <65536 active zones, the AMT indexes can be 16 bits wide. The total size of the AMT is equal to the size of one entry times maximum number of active zones (thousands), and therefore on the order of thousands of kilobytes.

The ZNS firmware runs within a specific SSD controller, and the SSD controller contains multiple CPUs. Some of the CPUs have a global view of the zones in the system (e.g., global system domain 510) and are aware of every zone and every active zone. Each CPU with a global system view has a dedicated closely coupled memory (CCM) attached to it, but that memory is on the order of thousands of kilobytes. Therefore, the AMT will either not fit in the CCM or would consume a majority of it and must be moved to a larger shared memory instead, which can store megabytes or gigabytes of data.

In contrast to the global system view of zones (e.g., global system domain 510), the NAND media can be accessed via multiple channels, where each channel includes multiple dies and many blocksets per die (e.g., hundreds). In a per channel domain 520, each NAND channel has a dedicated CPU for that channel in the SSD controller, and each CPU manages the media which is local to that channel. Therefore, some subset of all of the active zones will reside on the blocksets on each channel. If a global AMT index is used for tracking open blocksets throughout the system, it would require that an open block table be maintained on each channel CPU which can accommodate thousands of entries up to the maximum number of active zones. The channel CPUs can have even less CCM than other CPUs in the SSD controller, and are therefore unable to store tables with thousands of entries (e.g., one per active zone).

In order to decrease the memory requirements for open block tracking, the open blocksets corresponding to active zones are laid out across all of the NAND dies/channels. If the open blocksets are allowed to become unbalanced, it is possible that many open blocksets reside on just a few dies which are all on one channel, which means that the channel is required to potentially track all of the open blocks for all of the active zones in the memory system. Instead, the active zones or open blocksets can be evenly distributed across all of the logical unit numbers (LUNs) in the memory system and thus evenly distributed amongst all of the channels in the memory system. The maximum number of active zones divided by the number of planesets in the memory system will be equal to the ideal maximum number of active zones per planeset. It should be noted, however, that a planeset consists of all blocksets on the same channel, die, and plane grouping. Additional memory region can be provided by setting the maximum number of active zones per planeset to the ideal maximum zones per planeset plus a few extra zones for buffer. Additionally, each planeset may have open blocksets for refresh or internal system writes. The number of refreshes per planeset are also bounded to evenly distribute open refresh blocksets, and the total number of internal system blockset per planeset is limited. Thus, the total number of open blocksets to track per planeset is bounded by the following formula:

Maximum open blocksets per planeset=(Maximum number of active zones/number of planesets+ extra zones)×open blocksets per active zone+ maximum refresh targets per planeset+internal system blocks per planeset (where the "extra zones" are intended to allow for some flexibility in active zone allocation across NAND channels such that the active zones do not have to be perfectly split between all of the channels).

Maximum open blocksets per channel=maximum open blocksets per planeset×number of planesets per channel.

The number of refresh and internal system blocks can be relatively small, thus the total number of open blocksets per channel is effectively reduced from being equal to the maximum number of active zones, to maximum number of active zones/number of channels (e.g., with 10 channels in the memory system, only 1/10th of the memory per channel is required).

In order to realize this, the AMT can be partitioned into separate sections per planeset, such that certain indexes are only used by one planeset. For example, if 20 active zones per planeset are allowed, with 2 open blocksets per active zone, up to 2 refresh targets per planeset, and 4 system area blockset per planeset, then we require 20×2+2+4=46 unique open blockset indexes per planeset, and 46×1024 planesets=47,104 open block indexes. However indexes 0-45 would be used for planeset 0, 46-91 for planeset 1, and so on and so forth. Thus a local index per planeset can be implemented which is always between 0-45, and can be combined with the planeset number to convert back to a unique index between 0 and 47,103.

Figure 4:
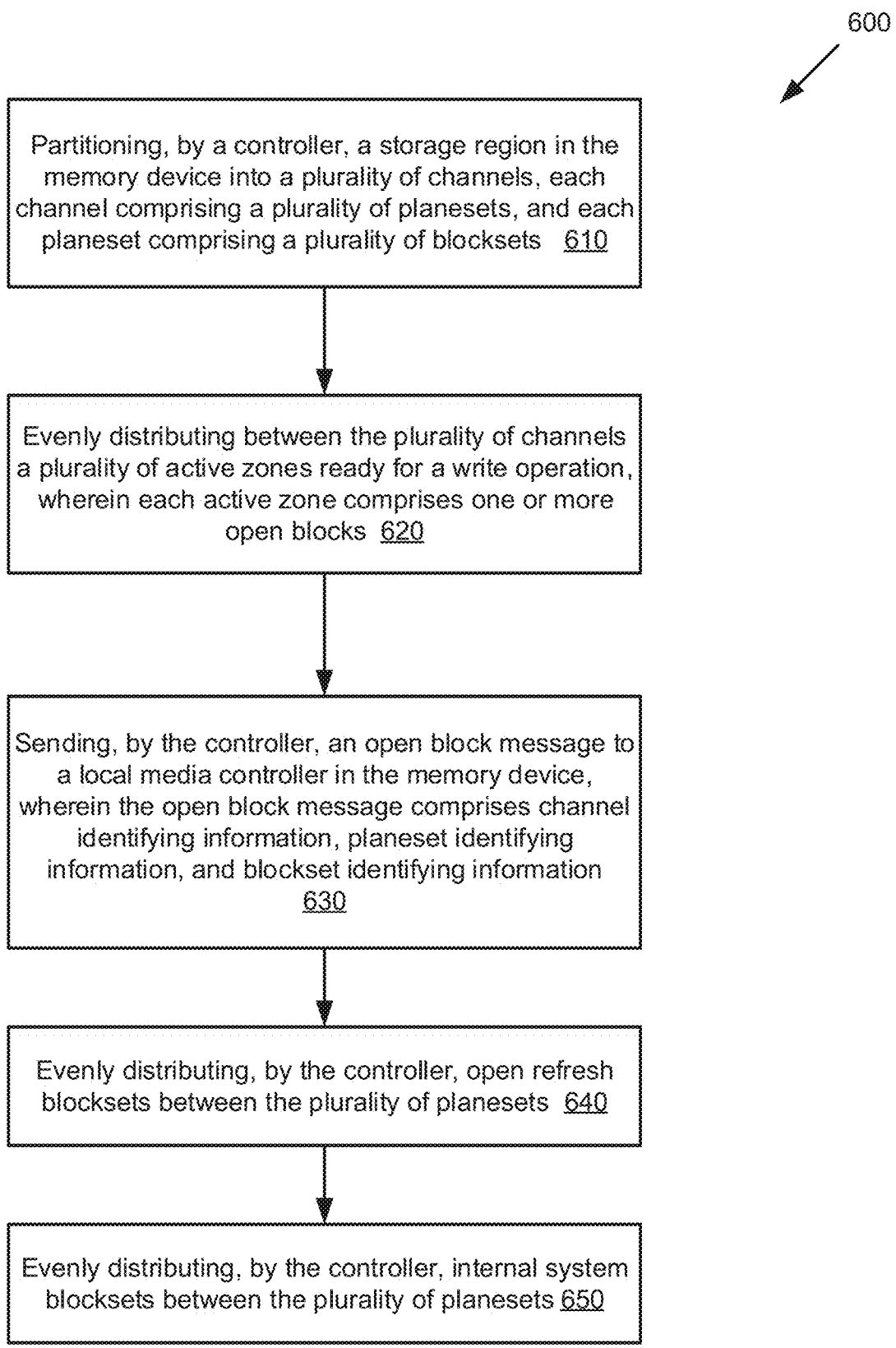
FIG. 4 is a flow diagram of an example method for tracking open blocks in a zoned namespace of a memory device in a memory sub-system.

FIG. 4 is a flow diagram of an example method 600 of tracking open blocks in a memory device in a memory sub-system, in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by open block management unit 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, the processing logic of the memory sub-system controller (e.g. controller 115) partitions a storage region in the memory device (e.g. memory device 130) into a plurality of channels. Each channel may include a plurality of planesets, and each planeset may include a plurality of blocksets. At operation 620, the processing logic of the memory sub-system controller evenly distributes between the plurality of channels a plurality of active zones that are ready for a write operation. Each active zone may include one or more open blocks. At operation 630, the processing logic of the memory sub-system controller may send an open block message to a local media controller in the memory device. The open block message may include channel identifying information, planeset identifying information, and blockset identifying information. The channel identifying information, the planeset identifying information, and the blockset identifying information collectively identify one or more open blocks ready for a write operation in the memory device. At operation 640, the processing logic of the memory sub-system controller may evenly distribute open refresh blocksets between the planesets, and, at operation 650, evenly distribute internal system blocksets between the plurality of planesets. As described above, the open blocks are either partially full or empty blocks ready for a write operation. The open blocks may include logical blocks that point to physical blocks within the memory device. The operation of distributing evenly between the plurality of channels may further include adding one or more buffer zones to the plurality of active zones such that the plurality of active zones and the one or more buffer zones together form a positive integer multiple of the plurality of channels.

Figure 5:
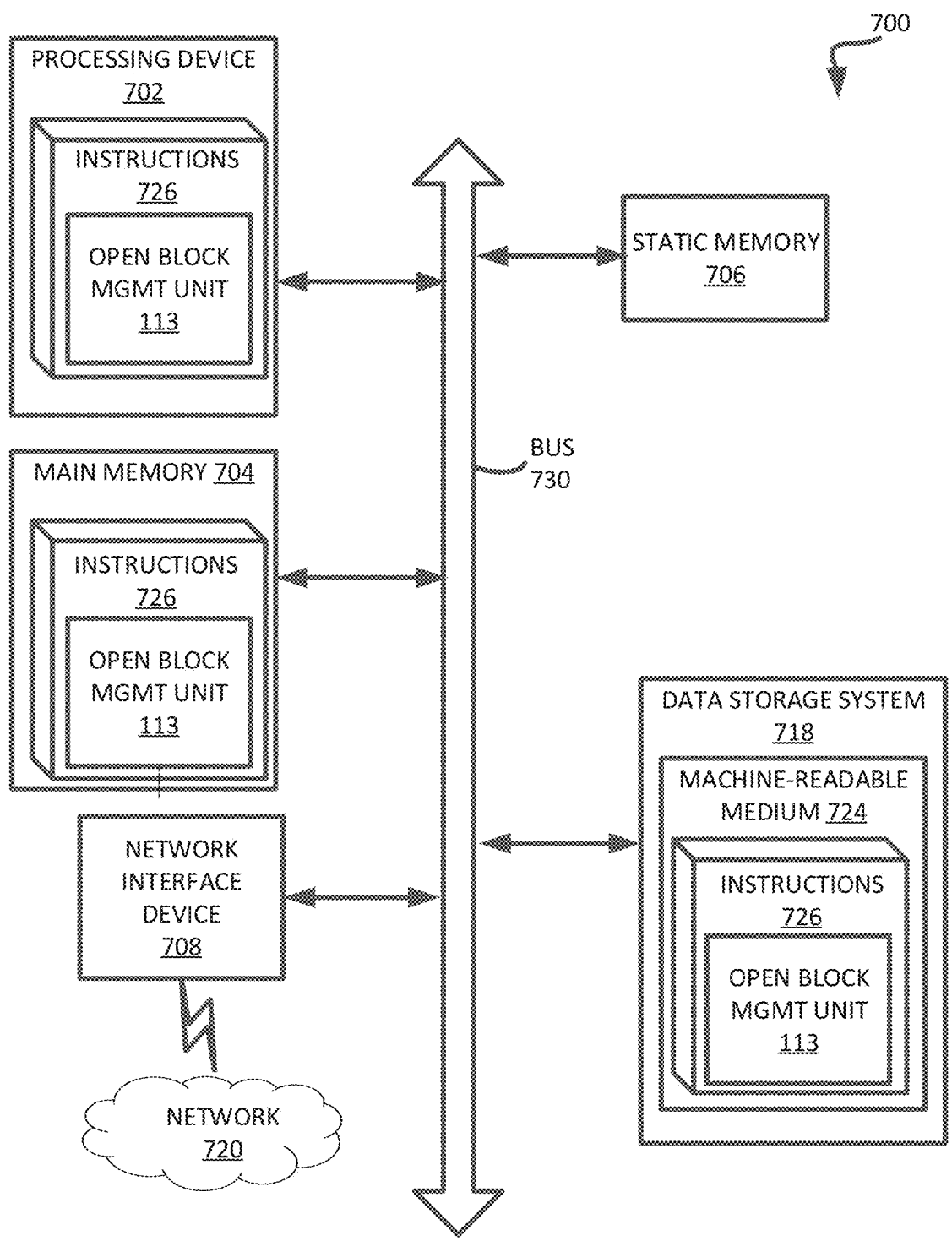
FIG. 5 is a block diagram of an example computer system in which embodiments of the present disclosure can operate.

FIG. 5 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to open block management unit 113, memory sub-system controller 115, or local media controller 135 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 727 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 727, data storage system 718, and/or main memory 704 can correspond to the memory sub-system 110 of FIG. 1.

In one embodiment, the instructions 726 include instructions to implement functionality corresponding to open block management unit 113 of FIG. 1). While the machine-readable storage medium 727 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an embodiment" or "one embodiment" or "an implementation" or "one implementation" or the like throughout may or may not mean the same embodiment or implementation. One or more embodiments or implementations described herein may be combined in a particular embodiment or implementation. The terms "first," "second," "third," "fourth," etc. as used herein are meant as labels to distinguish among different elements and may not necessarily have an ordinal meaning according to their numerical designation.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A non-transitory computer-readable storage medium comprising instructions that, when executed by a processing device, cause the processing device to perform operations comprising:
   partitioning a storage region in a memory device into a plurality of channels, each channel comprising a plurality of planesets, and each planeset comprising a plurality of blocksets;
   distributing between the plurality of channels a plurality of active zones ready for a write operation, wherein each active zone comprises one or more open blocks; and
   sending an open block message to a controller in a memory sub-system, wherein the open block message comprises channel identifying information, planeset identifying information, and blockset identifying information.

2. The non-transitory computer-readable storage medium of claim 1, wherein the operations further comprise:
   evenly distributing open refresh blocksets between the plurality of planesets; and
   evenly distributing internal system blocksets between the plurality of planesets.

3. The non-transitory computer-readable storage medium of claim 1, wherein the one or more open blocks are either partially full or empty blocks ready for a write operation.

4. The non-transitory computer-readable storage medium of claim 1, wherein the channel identifying information, the planeset identifying information, and the blockset identifying information collectively identify one or more open blocks ready for a write operation in the memory device, and wherein the one or more open blocks comprise logical blocks that point to physical blocks within the memory device.

5. The non-transitory computer-readable storage medium of claim 1, wherein the operation of distributing between the plurality of channels further comprises adding one or more buffer zones to the plurality of active zones such that the plurality of active zones and the one or more buffer zones together form a positive integer multiple of the plurality of channels.

6. A method for tracking open blocks in a memory device of a memory sub-system, the method comprising:
   partitioning, by a memory sub-system controller, a storage region in the memory device into a plurality of channels, each channel comprising a plurality of planesets, and each planeset comprising a plurality of blocksets;
   evenly distributing, between the plurality of channels, a plurality of active zones ready for a write operation, wherein each active zone comprises one or more open blocks; and
   sending, by the memory sub-system controller, an open block message to a local media controller in the memory device, wherein the open block message comprises channel identifying information, planeset identifying information, and blockset identifying information,
   wherein the channel identifying information, the planeset identifying information, and the blockset identifying information collectively identify one or more open blocks ready for a write operation in the memory device.

7. The method of claim 6, further comprising:
   evenly distributing, by the memory sub-system controller, open refresh blocksets between the plurality of planesets; and
   evenly distributing, by the memory sub-system controller, internal system blocksets between the plurality of planesets.

8. The method of claim 6, wherein the one or more open blocks are either partially full or empty blocks ready for a write operation.

9. The method of claim 6, wherein the one or more open blocks comprise logical blocks that point to physical blocks within the memory device.

10. The method of claim 6, wherein the step of distributing evenly between the plurality of channels further comprises adding one or more buffer zones to the plurality of active zones such that the plurality of active zones and the one or more buffer zones together form a positive integer multiple of the plurality of channels.

11. The method of claim 6, wherein the memory sub-system comprises a Solid State Drive (SSD) and wherein the plurality of active zones comprise Zoned Namespaces (ZNS).

12. The method of claim 6, wherein the active zone comprises an extent of the file system, wherein the extent comprises a contiguous group of blocks of the memory device that store a portion of a file.

13. The method of claim 6, further comprising:
   determining, by the memory sub-system controller, whether the zone of the memory device has sufficient space for a storage unit, wherein the determining is based on a write pointer of the zone and an end location of the zone; and
   responsive to the zone having sufficient space, allocating the storage unit in the zone.

14. A system comprising:
   a memory sub-system comprising:
      a memory device; and
      a local media controller, operatively coupled with the memory device; and
   a controller, operatively coupled to the memory sub-system, to perform operations comprising:
      partitioning a storage region in the memory device into a plurality of channels, each channel comprising a plurality of planesets, and each planeset comprising a plurality of blocksets;

evenly distributing between the plurality of channels a plurality of active zones ready for a write operation, wherein each active zone comprises one or more open blocks; and sending an open block message to a controller in the memory sub-system, wherein the open block message comprises channel identifying information, planeset identifying information, and blockset identifying information, wherein the channel identifying information, the planeset identifying information, and the blockset identifying information collectively identify one or more open blocks ready for a write operation in the memory device.

15. The system of claim 14, wherein the operations further comprise:

evenly distributing open refresh blocksets between the plurality of planesets; and evenly distributing internal system blocksets between the plurality of planesets.

16. The system of claim 14, wherein the one or more open blocks are either partially full or empty blocks ready for a write operation.

17. The system of claim 14, wherein the one or more open blocks comprise logical blocks that point to physical blocks within the memory device.

18. The system of claim 14, wherein the operation of distributing evenly between the plurality of channels further comprises adding one or more buffer zones to the plurality of active zones such that the plurality of active zones and the one or more buffer zones together form a positive integer multiple of the plurality of channels.

19. The system of claim 14, wherein the system comprises a Solid State Drive (SSD) and wherein the plurality of active zones comprise Zoned Namespaces (ZNS).

20. The system of claim 14, wherein the active zone comprises an extent of the file system, wherein the extent comprises a contiguous group of blocks of the memory device that store a portion of a file.

* * * * *